(No Model.) 2 Sheets—Sheet 2.
E. LATHROP.
ROAD SCRAPER.
No. 334,177. Patented Jan. 12, 1886.
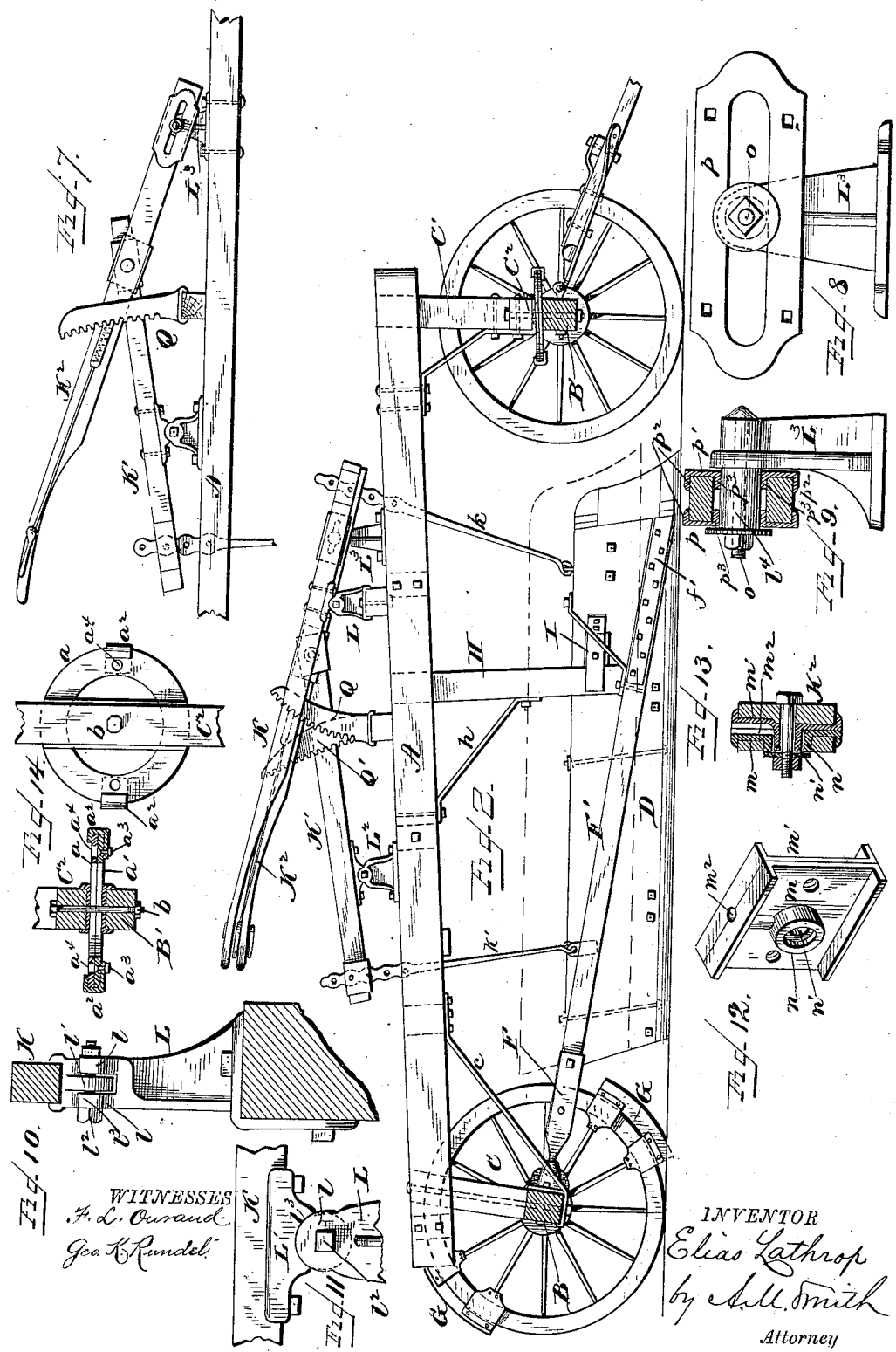
WITNESSES
F. L. Durand
Geo. K. Rundel
INVENTOR
Elias Lathrop
by A. M. Smith
Attorney

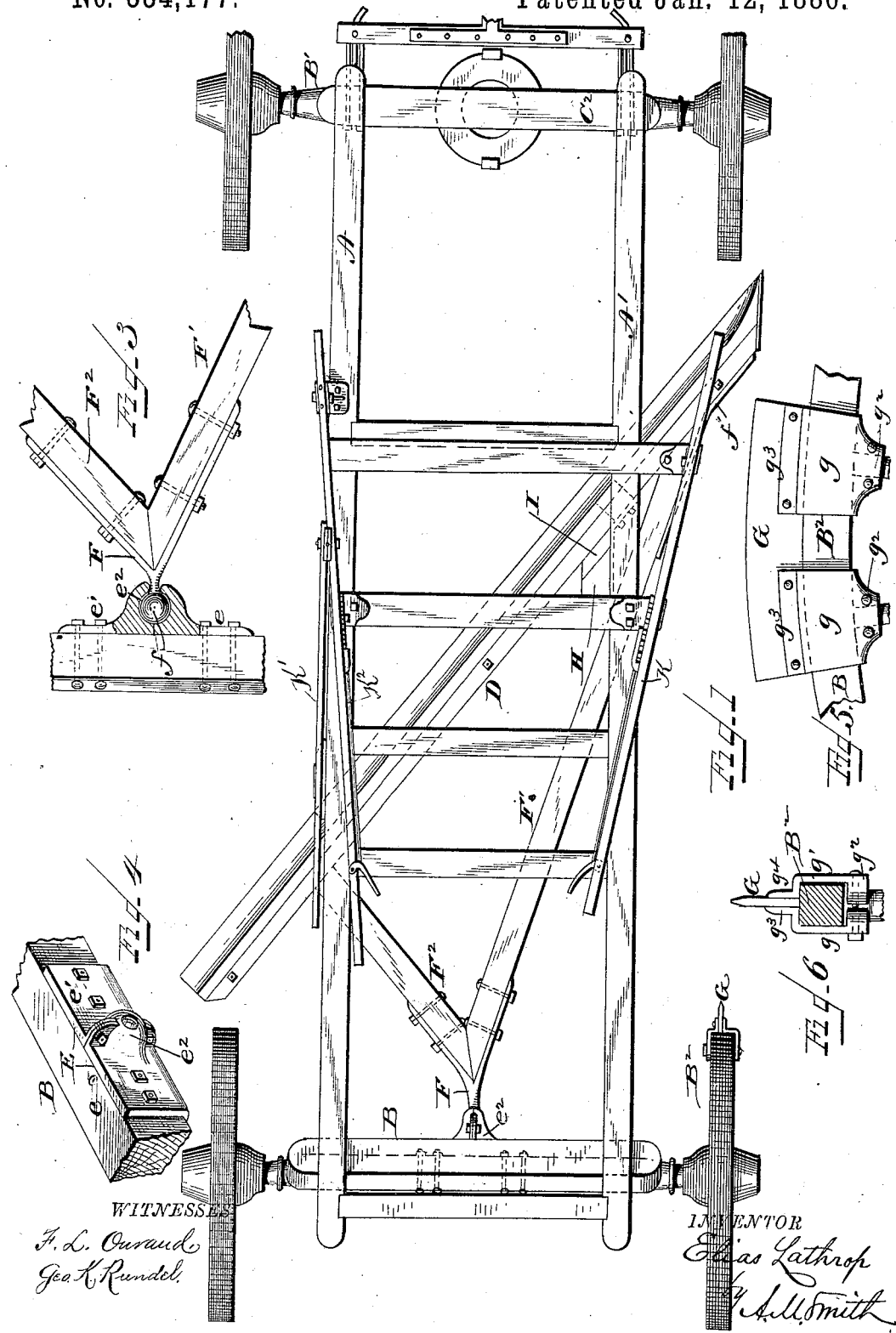

United States Patent Office.

ELIAS LATHROP, OF FORT WAYNE, INDIANA, ASSIGNOR TO THE FLEMING MANUFACTURING COMPANY, OF SAME PLACE.

ROAD-SCRAPER.

SPECIFICATION forming part of Letters Patent No. 334,177, dated January 12, 1886.

Application filed September 10, 1885. Serial No. 176,709. (No model.)

*To all whom it may concern:*

Be it known that I, ELIAS LATHROP, of Fort Wayne, county of Allen, and State of Indiana, have invented a new and useful Improvement in Road-Scrapers, of which the following is a full, clear, and exact description, reference being had to the accompanying drawings, making part of this specification.

My invention relates to that class of scrapers or road-graders and levelers employing a four-wheel supporting and guiding carriage or its equivalent, and having the obliquely-arranged scraper interposed between the forward and rear trucks thereof; and it consists in connecting the scraper with the axle or axle-bar of the rear truck, and propelling it therefrom by means of arms or braces attached to said axle by a ball-and-socket or universal joint adapted to permit the free adjustment of the scraper; in a novel construction and arrangement of the levers for effecting the adjustment of the scraper; in a novel construction of the wheel-flanges for preventing lateral slipping or movement of the machine under the oblique thrust of the load; in a novel construction of the fifth-wheel for facilitating the control or guidance of the machine, and in certain details of construction and arrangement hereinafter described and claimed.

In the accompanying drawings, Figure 1 is a plan view of so much of a road-scraper as is necessary to show my improvements; Fig. 2, a vertical longitudinal section taken just inside the right-hand or "off" wheels of the trucks, showing the frame and scraper and their connecting and adjusting devices in side elevation; Fig. 3, a plan view, partly broken away, of the joint between the scraper frame or braces and the rear axle; Fig. 4, a perspective view of a portion of the rear axle, showing the divided socket-piece thereon; Fig. 5, a side elevation, enlarged, of a portion of one of the wheels and its flange; Fig. 6, a transverse section through the parts shown in Fig. 5; Fig. 7, a side elevation of the levers, &c., for effecting the adjustment of the rear end of the scraper. Figs. 8, 9, 10, 11, 12, and 13 are detail views of the adjusting lever-supports and joints hereinafter described, and Fig. 14 a plan and a sectional view of the fifth-wheel.

The frame of the machine or carriage is made by preference in the rectangular form shown, consisting of the side bars, A and A', united by suitable end bars, and supported at a suitable height above the axles B and B' by uprights C C', to permit the wheels on the forward axle, B', to move under it for facilitating the turning of the machine, and also to provide room for the required vertical adjustment of the scraper-bar D, arranged in an oblique position underneath the frame between the axles or trucks, as shown; but any suitable form or construction of frame may be employed. The rear uprights or pedestals, C, are rigidly connected with the frame and rear axle or axle-bar, B; but the forward ones, C', are connected at their lower ends to a transverse bar, $C^2$, to the lower face of which the upper portion of the fifth-wheel is attached, as will be explained, and both the rear and forward uprights are properly supported from the frame by means of oblique braces $c\ c'$, as shown. The two disks or annular plates $a$ and $a'$, forming the fifth-wheel, are secured in any suitable manner, one to the forward axle, B', and the other to the transverse frame-bar $C^2$, resting on said axle, preferably by means of diametrically-arranged sockets, in which said frame-bar and axle rest, as shown in Fig. 14, and suitable bolts, and the two are held connected one with the other by means of angle irons or clips $a^2$, rigidly secured to the lower plate by means of bolts $a^3$, which are passed through holes $a^4$ in the upper plate, and have their heads countersunk in the lower plate, to permit the plates to rest and turn freely relatively one in contact with the other. The upper ends of the angle irons or clips $a^2$ overhang the face of the upper plate, $a$, at its outer edge, and hold it securely in place on the lower plate, $a'$. This forms a simple and durable construction of the fifth-wheel, admirably adapted to the conditions of its use, one that is not liable to get out of order, and that can be easily repaired when required. The pole or tongue is connected by suitable straps or hounds with the axle B', and the latter, with its plate $a'$, is connected to the frame-bar $C^2$ by means of the usual king-bolt, $b$, in addition to the angle-irons connecting the parts of the fifth-wheel, as explained, for permitting the axle B' to turn freely with the pole in guiding the machine.

The axle or axle-bar B has secured to its forward face a divided casting, E, the two parts $e$ and $e'$ of which are provided on their adjoining ends or sides each with the half of a spherical socket, (indicated at $e^2$, Figs. 3 and 4,) the front wall of which is perforated to accommodate a shank or neck formed on the rear end of an angle-iron, F, and terminating in a ball, $f$, adapted to fit and turn in the socket $e^2$. The angle in the iron or casting F forms a fork, to the diverging arms of and between which are secured diverging braces, one, F', extending to a point near the forward end of the obliquely-arranged scraper-bar D, and secured to said bar by means of an angle iron or strap, $f'$, and the other, $F^2$, extending to and connected with the scraper-bar in a similar manner near the rear end of the latter. By this arrangement of the scraper-frame bars or braces I obtain a strong and simple scraper-bar frame well calculated to perform the work required of it, and adapted, by means of its ball-and-socket connection with the forward face of the rear axle, to be propelled or pushed forward directly from the latter, and to be adjusted at either end independently of the other, as may be required.

For preventing lateral movement or dragging of the machine, liable to occur from the oblique arrangement of the scraper and the lateral thrust of the earth upon the scraper due to such arrangement, I provide the wheel or wheels of the rear truck, when necessary, with a pheripheral flange, G, made by preference in sections of an annulus, and secured between angular clamping-plates $g g'$, arranged in pairs, embracing the rim $B^2$ of the wheel between them, and secured to spokes of the wheel inside the rim by suitable socketed arms and through-bolts $g^2$, as shown. The sections of this annular flange are clamped between flanges or lips $g^3 g^4$ on the outer ends of the clamping-plates $g$ and $g'$, and may be secured to said lips by means of rivets or bolts passing through either or both of the opposing lips, as preferred. The flange G' may extend entirely around the wheel, or the sections may be separated by short spaces, as preferred. By attaching them to the spokes of the wheel by means of the angular clamps, as described, the strain is largely removed from the rims of the wheels, and said rims can consequently be made much lighter than when they have to be formed to receive and support the flanges, in case the latter should be required. These flanges G penetrate the ground as the machine is drawn forward, and prevent lateral sliding of the wheels and machine.

The means for effecting and guiding the vertical adjustments of the scraper are as follows: H is a pendent bar rigidly secured to the carriage-frame side bar, A', in rear of the scraper-bar near the junction of the latter with the brace F', and stiffened by means of one or more oblique braces, $h$, as shown, the lower end of said bar projecting down in rear of the scraper-bar in contact therewith or with a wear and guide plate or block, I, secured to the latter, and adapted to move up and down on said post as the scraper is adjusted for steadying and guiding the movements of the latter.

K is a lever pivoted in a standard, L, on the frame, and having its short forward arm connected by an adjustable link, $k$, with the scraper-bar D near the forward end of the latter. The standard L is bifurcated or provided with ears $l\,l$ at its upper end to receive a perforated ear, $l'$, formed on a socketed block or plate, L', secured to the lower face of lever K, said ear $l'$ being secured in place between the ears $l\,l$ by a through-bolt, $l^2$. The upper ends of the ears $l\,l$ are rounded and rest in seats or bearings of concave or semicircular form formed in the block or plate L' at the sides of ear $l'$, as shown at $l^3$. (See Figs. 10 and 11). By this construction the weight of the lever and its attachments, and the wear consequent thereon, is thrown on the rounded ears $l\,l$, instead of on the bolt $l^2$, and the latter merely serves to prevent accidental displacement of the lever. The lever K', adjustably connected with the rear end of the scraper-bar, is supported in a similar manner upon a standard, $L^2$; but to economize space the lever K' is made to extend forward from its connection with the scraper, and has its forward end pivoted to a second lever, $K^2$, having a sliding connection with its supporting-standard $L^3$, as will be explained. The levers K' and $K^2$ at their junction or pivot have wear-plates $m$ and $m'$ secured to them—one, $m$, provided with a short sleeve, $n$, on its side, secured to the lever K', said sleeve penetrating said lever and serving as a bearing for a second sleeve, $n'$, formed on the plate $m'$, and resting and turning in the sleeve $n$. A bolt passing through the sleeves serves to unite the levers and wear-plates. (See Figs. 12 and 13.) A cylindrical groove formed one half in each of the opposing wearing-surfaces of the wear-plates, as shown at $m^2$, and extending inward to the sleeves, serves to permit the oiling of the latter and of the wear-faces of the plates. The forward end of lever $K^2$ is slotted to pass over and permit it to slide lengthwise on a sleeve-stud, $l^4$, on the standard $L^3$, (see Figs. 8 and 9,) and is clamped between two slotted plates, $p\,p'$, having flanges $p^2\,p^3$, which form sockets for the two portions of the lever on opposite sides of the slot. These plates are fastened to the lever by through-bolts or rivets, and the inner flanges, $p^3$, entering the slot in the lever, serve to take the wear due to the adjustment of the lever $K^2$, and a through-bolt, $o$, serves to hold the lever in place on the sleeve-stud $l^4$. The lever $K^2$ being pivoted to the lever K', and the latter turning on a fixed fulcrum, the lever $K^2$ must necessarily slide on its fulcrum when it is vibrated for acting on the lever K', and this sliding movement is provided for by the construction last above described. The arrangement of levers described brings the actuating ends of the levers K and K² into convenient proximity to be operated by the attendant on the machine without necessitating a change in his place or position thereon for that purpose. The levers K and K² are provided each with a thumb-latch adapting them to be held at any desired adjustment by means of standard-racks Q Q', in a manner well known.

The operation of the levers will be readily understood without further description. It is sufficient to say that by their aid either end of the scraper may be raised or lowered for setting it at any desired angle of presentation to the surface to be operated upon, and the manner of connecting the scraper to the rear axle permits such adjustment without straining or twisting any of the parts, and without disturbing the relation of the scraper to its propelling attachments.

Aside from the features specifically pointed out, the machine may be of any usual or preferred construction.

Having now described my invention, I claim as new—

1. The obliquely-arranged scraper located between the carriage-supporting trucks and propelled from the rear axle through oblique thrust-braces having a ball-and-socket or universal-joint connection with said axle, substantially as described.

2. The obliquely-arranged scraper, in combination with converging braces in rear thereof, united in an angle-iron having a ball-and-socket or universal-joint connection with the propelling and supporting carriage, substantially as described.

3. The combination, with the obliquely-arranged scraper, of the obliquely-arranged braces, the angle-iron connecting said braces, and the ball-and-socket or universal joint between said braces and the supporting-carriage, substantially as described.

4. The combination, with the rear axle of the supporting-carriage, of the divided casting or socket-plates having the cylindrical socket formed therein, and the angle iron or casting provided with the ball fitting said socket and connected with the scraper-bar, for supporting and propelling the latter, substantially as described.

5. The lever K², provided with the slotted clamping and wear plates, in combination with and mounted upon the sleeve-stud of its supporting-standard and the retaining-bolt, arranged and operating substantially as described.

6. The levers K' and K², mounted on separate fulcrums and pivoted one to the other, in combination with the interposed wear-plates provided with the pivotal sleeves, and the through-bolt for connecting said levers and wear-plates, substantially as described.

7. The combination, with the scraper-supporting frame and its forward truck or axle, of the fifth-wheel composed of the upper and lower rings or plates, the angle irons or clips connecting said plates, and the countersunk bolts adapted to be passed through perforations in one of said plates for securing the retaining-clips removably to the other plates, substantially as described.

8. In a road-scraper, the carrying-wheel provided with the peripheral flange made in sections, in combination with clamping-plates striding the rim for securing said flange-sections to the spokes between the rim and hub of the wheel, substantially as described.

In testimony whereof I have hereunto set my hand this 5th day of September, A. D. 1885.

ELIAS LATHROP.

Witnesses:
WILLIAM FLEMING,
ALFRED SHRIMPTON.